(12) United States Patent
Koopman et al.

(10) Patent No.: US 8,146,487 B2
(45) Date of Patent: Apr. 3, 2012

(54) MIXING DEVICE, COFFEE MACHINE PROVIDED WITH MIXING DEVICE AND USE OF MIXING DEVICE

(75) Inventors: Carlos Nikolaas Jozef Maria Koopman, Heerhugowaard (NL); Andreas Raymond Van de Leijgraaf, Alkmaar (NL); Romanus Eduard Verhoeven, Heerhugowaard (NL); Johannes Theodorus Emerentia Huiberts, Spanbroek (NL)

(73) Assignee: Nestec S.A., Vevey (CH)

( * ) Notice: Subject to any disclaimer, the term of this patent is extended or adjusted under 35 U.S.C. 154(b) by 1245 days.

(21) Appl. No.: 11/576,020

(22) PCT Filed: Sep. 22, 2005

(86) PCT No.: PCT/EP2005/010229
§ 371 (c)(1),
(2), (4) Date: Sep. 5, 2007

(87) PCT Pub. No.: WO2006/034810
PCT Pub. Date: Apr. 6, 2006

(65) Prior Publication Data
US 2011/0158036 A1 Jun. 30, 2011

(30) Foreign Application Priority Data
Sep. 27, 2004 (EP) .................................. 04077663

(51) Int. Cl.
*A47J 31/00* (2006.01)
*B01F 7/04* (2006.01)
(52) U.S. Cl. ......... 99/323.1; 99/287; 366/316; 366/317; 222/190; 222/236
(58) Field of Classification Search .................. 366/316, 366/317, 315, 314, 305, 278, 343; 99/323.1, 99/287, 289 R, 293
See application file for complete search history.

(56) References Cited

U.S. PATENT DOCUMENTS

| 3,140,861 | A | * | 7/1964 | Krup ........................ 366/156.1 |
| 3,606,274 | A | * | 9/1971 | Nelson ........................ 366/293 |
| 3,938,784 | A |   | 2/1976 | Moreton |
| 4,185,927 | A | * | 1/1980 | Uttech ........................ 366/131 |
| 4,610,548 | A | * | 9/1986 | Hallet et al. .................. 366/279 |

(Continued)

FOREIGN PATENT DOCUMENTS
EP        1 116 464        7/2001
(Continued)

*Primary Examiner* — Reginald L Alexander
(74) *Attorney, Agent, or Firm* — K&L Gates LLP

(57) ABSTRACT

The present invention relates to a mixing device for aerating and frothing a product that comprises a fluid component and at least one further component, comprising a rotor (101) having a rotational axis (102) and a surface of revolution (4) defined by the rotor (101) upon rotation around its rotational axis (102), the surface of revolution (4) extending from a first axial (105) end to a second axial end (106), and the first axial end (105) being arranged upstream with respect to the second axial end (106); a motor in driving association with the rotor (101) for rotating the rotor about the rotational axis (102); and a product exit conduit disposed downstream of the rotor and configured for dispensing the aerated and frothed product of the fluid and at least one further component, which rotor (101) comprises a downstream part (108) and an upstream part (107). The invention relates furthermore to a beverage machine provided with the aforementioned mixing device.

29 Claims, 4 Drawing Sheets

U.S. PATENT DOCUMENTS

| | | | |
|---|---|---|---|
| 4,903,585 A * | 2/1990 | Wimmers et al. | 99/275 |
| 4,913,555 A * | 4/1990 | Maeda et al. | 366/205 |
| 5,912,039 A * | 6/1999 | Browne | 426/565 |
| 5,927,553 A | 7/1999 | Ford | |
| 2003/0150879 A1 * | 8/2003 | Ufheil et al. | 222/190 |

FOREIGN PATENT DOCUMENTS

| | | |
|---|---|---|
| GB | 2 345 252 | 7/2000 |
| JP | 10-208144 | 7/1998 |
| WO | WO 03/068039 | 8/2003 |

* cited by examiner

MIXING DEVICE, COFFEE MACHINE PROVIDED WITH MIXING DEVICE AND USE OF MIXING DEVICE

FIELD OF THE INVENTION

The present invention relates to a mixing device that provides a frothy fluid product. More particularly, the invention relates to a mixing device for mixing, frothing, and dispensing a beverage, to a coffee machine provided with such a mixing device and to the use of the mixing device.

A mixing device for aerating and frothing a product that includes a fluid component and at least one additional component is known from WO 03/068039 in the name of Société des Produits Nestle S.A. Switzerland.

BACKGROUND

Espresso and other coffee and milk drinks are often prepared by mixing a powder in water. Traditionally, a milk froth is provided to the drink by steam frothing.

Mixing devices are known for speedier preparation of such beverages and other foods by mixing a powdered food component with a liquid, such as water. These devices typically feed the powdered component into the water, which is often pumped tangentially into the mixing chamber to create a whirlpool to mix the powder into the water. The mixture is then fed to a mixing mechanism—also called a whipping mechanism—, which is usually a rotating plate. The plate aerates the mixture and produces a froth. The frothed mixture is usually dispensed into a container for drinking.

U.S. Pat. No. 5,927,553, for example, discloses a mixing and dispensing apparatus with a cruciform frothing blade. Other shapes of frothing blades are also known. For instance, companies such as Rhea and Zanussi use whippers with an axially short disk with very steep sloped walls. Other whippers have rotors with independent ramps extending from a substantially flat plate. The known devices generally have their greatest efficiency for preparing a small group of products.

EP 1,116,464 of Bravilor discloses a mixing device comprising a motor 14 provided with a driving shaft 15 carrying a rotor 16,17. The rotor consists of a circular disc 16 provided with ribs 17. The ribs 17 are arranged on a circular end face of the disc 16 and extend from this end face in axial direction. How the ribs 17 exactly extend along the circular end face is neither described nor shown in EP 1,116,464. Only one rib is shown in side view. This rib appears to extend about diagonally over the circular end face of disc 16. The one rib 17 is at its radial outer ends tapered in the upstream direction. The product exit conduit 11 of EP 1,116,464 is arranged on the upstream side of the disc 16, radially beside the ribs.

WO 03/068039 of Nestle discloses a mixing device for aerating and frothing a product that includes a fluid component and at least one additional component. In this mixing device the rotor consists essentially of a tapering, preferably conically tapering, rotor body which is, on the tapering rotor surface provided with twisted, relatively small and accurately dimensioned grooves. The rotor housing has a corresponding tapered inner surface, but is a little larger so that there is a small, accurately defined gap between the housing and tapered rotor surface. Also at the downstream side of the rotor there is a small, accurately defined gap between the back surface of the rotor and the rotor housing. This accurate shape and accurate dimensions of the rotor and grooves provided in it as well as the accurate dimensions of the gap provide a very good frothing and aerating, which is highly desirable with instant coffee and milk drink machines. When the rotational speed of the rotor is sufficiently high the reliability of this mixing device on long term is also very good. However with rotational speeds of the rotor below 10,000 revolutions per minute (rpm) there occurs deposition of un-dissolved or partly dissolved components on the rotor and housing, which deposition results in clogging of the gaps and grooves. This clogging is in those kind of devices undesirable. Taking into account that the dimensions of gaps and grooves must meet very accurate requirements for optimal results, this known mixing device is relatively expensive in manufacturing and vulnerable for decrease in performance in case of clogging.

There is thus clearly a need for a mixing device, especially for instant drink machines, with a very good, if not improved, frothing and aerating effect, which is less, preferably not, vulnerable for decrease in performance as a consequence of clogging.

The object of the invention is to provide such an improved mixing device.

SUMMARY

This object is according to the invention achieved by providing a mixing device that provides a frothy fluid product.

Starting from WO 03/068039, i.e., a mixing device for aerating and frothing a product that comprises a fluid component and at least one further component, comprising:

a rotor having a rotational axis and a surface of revolution defined by the rotor upon rotation around its rotational axis, the surface of revolution extending from a first axial end to a second axial end, and the first axial end being directed to the input container and arranged upstream with respect to the second axial end; the rotor comprising a downstream part and an upstream part;

a motor in driving association with the rotor for rotating the rotor about the rotational axis; and a product exit conduit disposed downstream of the rotor and configured for dispensing the aerated and frothed product of the fluid and at least one further component.

This object is achieved in that the downstream part comprises a rotational body having a first end surface facing upstream, a second end surface facing downstream and a downstream rotational surface facing in radial outward direction; in that the upstream part comprises an upstream rotational surface facing in radial outward direction, the upstream rotational surface being provided with ribs extending in axial (A) and radial (R) direction, the ribs having radial edges facing in radial outward direction, chambers being defined between adjacent ribs, the first end surface and the downstream rotational surface, in that the surface of revolution is defined by the downstream rotational surface and the radial edges of the ribs.

By providing the chambers, spaces are created in which un-dissolved or partially dissolved particles can dissolve, which dissolving is considerably promoted by the ribs which create high turbulences. Also, air is easily trapped in those chambers and beaten by the high turbulences into the liquid, which enhances the frothing effect.

In a preferred mode, the downstream rotational surface is provided with grooves extending from the first to the second end surface. The higher turbulence caused by the ribs thus propagates in the grooves and between the rotor and rotor housing. The higher turbulence thus also counteracts deposition of particles on the rotor and rotor housing downstream of the ribs and chambers. Preferably, in each said chamber debouches at least one of said grooves.

The chambers are relatively large with respect to the grooves. Viewed in axial direction the passage width (in mm$^2$) of the grooves debouching in one chamber is smaller than the passage width (in mm$^2$) of this one chamber, also viewed in axial direction. This (axial) passage width of the grooves (in mm$^2$) debouching in one chamber will be between 5 and 25% of the (axial) passage width (in mm$^2$) of said one chamber. Expressed differently and viewed in tangential direction, the width of each chamber (in mm) will be larger than the width (in mm) of the grooves debouching in it.

The grooves in the downstream part of the rotor act to keep the rotating motion of the fluid (induced by the upstream part of the rotor) going.

Further tests with the invention revealed that as a consequence of the new and inventive rotor design, the requirements with respect to the accuracy of the dimensions of gaps, grooves and rotor is of much less importance than in the case of the design of WO 031068093. On the one hand this provides an easier manufacturing and on the other hand it reduces the chance on a reduced performance in case some depositing of particles might take place. In other words the performance of the present mixer is less susceptible for negative effects due to depositing of particles.

In order to make use of centripetal forces for frothing and aerating, it is advantageous when the diameter of the surface of revolution at the first axial end is smaller than the diameter of the surface of revolution at the second axial end.

In order to support transfer of product from the chambers to the grooves and to the downstream of the rotor, it is advantageous when, with respect to the rotational axis, the radial edges of the ribs taper, preferably taper conically, in upstream direction. This creates a turbulence which increases along the ribs in downstream direction.

In order to support transport of product along the downstream part of the rotor and to counteract, preferably prevent, there a decrease in the level of turbulence earlier created, it is according to the invention advantageous when, with respect to the rotational axis, the downstream rotational surface tapers, preferably tapers conically, in upstream direction.

According to a further embodiment of the invention it is advantageous when the upstream rotational surface is a cylindrical surface. On the one hand this provides that the passage width of the chambers increases in axially downstream direction, whilst on the other hand this provides an easier manufacturing.

According to a further embodiment of the invention it is, with respect to an easier production of the rotor, advantageous when the ribs extend essentially strictly in axial direction and/or essentially strictly in radial direction.

In order to promote breakage of larger solid particles upon entering the chambers of the rotor as well as to enhance turbulence effects, it is according to the invention advantageous when the ribs have a rounded upstream edge.

According to still a further embodiment of the invention it is advantageous when the axial length of the upstream part and the axial length of the downstream part are about the same. The longer the downstream part will be, the more uniform the air bubbles will become. However, also the longer the upstream part is, the better ingredient and air are dissolved in the liquid. Taking into account the limited length available for the rotor, this results in the compromise to make both parts about the same length.

Concerning features and advantages of the present invention, similar or identical to the device of WO 03/068039; reference is made to the description of WO 03/068039, especially but not exclusively to pages 2 and 3 of WO 03/068039.

Additional features and advantages are described herein, and will be apparent from the following Detailed Description and the figures.

DETAILED DESCRIPTION

Figure 1:
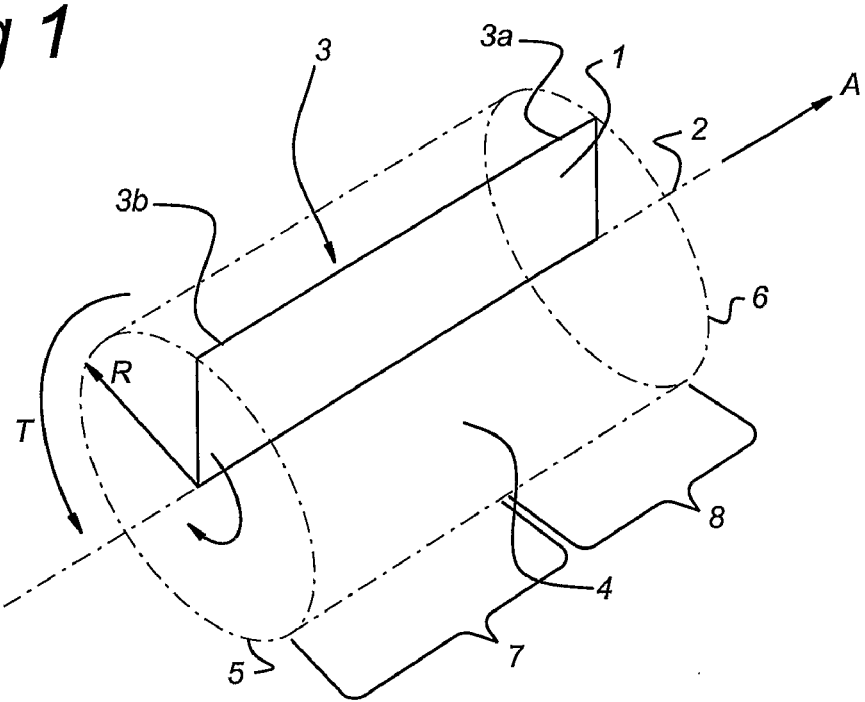
FIG. 1 is a schematic perspective view of a rotor for the purpose of defining some terms used in the present disclosure.

FIG. 1 explains with a perspective and schematic view some of the terms used in the present disclosure. FIG. 1 shows a rotor 1, which as an example has the form of a rectangular plate. This rotor 1 is rotatable around a rotational axis 2. The rotor 1 has a radial outer edge 3. When one rotates the rotor 1 around its rotational axis 2, the outer edge 3 will describe a rotational contour 4, which in this example will be cylindrical. This rotational contour 4 is called "the surface of revolution defined by the rotor upon rotation around its rotational axis", in short "the surface of revolution". This "surface of revolution" thus is primarily a notational or hypothetical surface in mathematical sense. In case the rotor would be for example a cylinder having the rotational axis coinciding with the cylindrical axis, the cylindrical outer surface of this cylinder would coincide with its "surface of revolution".

Referring further to FIG. 1, the surface of revolution 4 extends between a first axial end 5 and second axial end 6. Assuming the first axial end 5 is facing in an upstream direction, the first axial end 5 is arranged upstream with respect to the second axial end, and the rotor can be divided in an upstream part 7 and downstream part 8. Correspondingly the outer edge 3 is divided in an upstream part 3b and a downstream part 3a.

Further in FIG. 1, arrow A indicates the axial direction (the arrow A points in the downstream direction), arrow R indicates the radial direction (the arrow points in the radial outward direction), and arrow T indicates the tangential direction.

Figure 2:
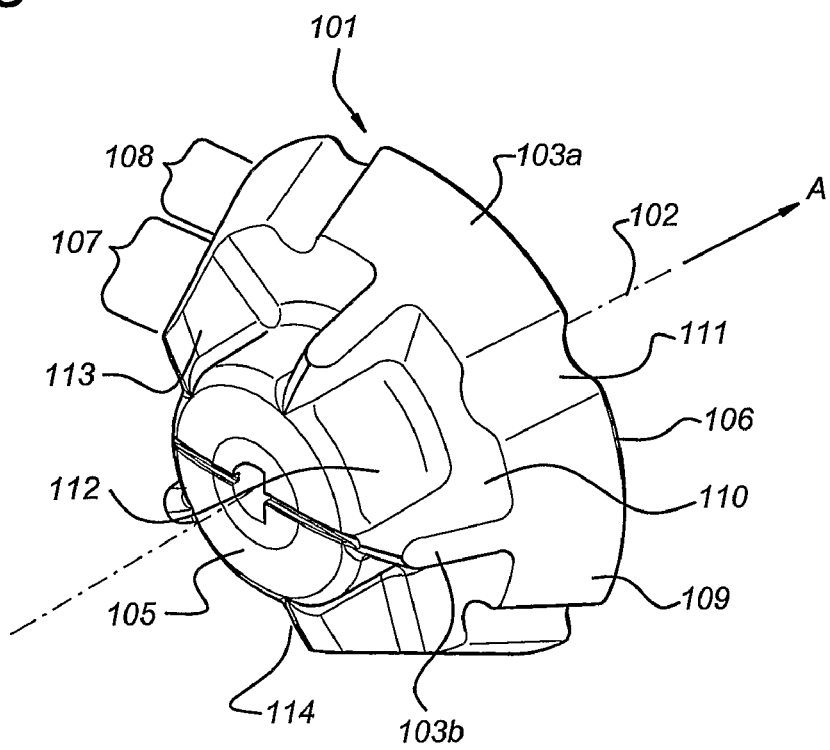
FIG. 2 is a perspective view of a rotor according to the invention.

FIG. 2 shows a rotor according to the invention. The terms as explained in FIG. 1 are indicated in FIG. 2 with the same reference number increased by 100. The entire rotor is indicated by 101. The reference number 104 has been omitted in order not to disturb the clearness of FIG. 2. It will however be clear that, in the case of FIG. 2, the surface of revolution is a conical surface defined by the tapering surface parts 103a and tapering edges 103b.

The rotor 101 comprises a downstream part 108 and an upstream part 107.

The downstream part 108 is a rotational body 109. The rotational body 109 has a first end surface 110 facing upstream (opposite to arrow A); a second end surface 106 facing downstream (in the direction of arrow A); and a downstream rotational surface 103a. The downstream rotational surface 103a faces in radial outward direction and extends from the first end surface 110 to the second end surface 106. In this case the second end surface 106 corresponds to the so called second axial end of the rotor 101.

The upstream part 107 has an upstream rotational surface 112. This upstream rotational surface 112 faces in radial outward direction (arrow R in FIG. 1). The upstream rotational surface 112 is provided with ribs 113. The ribs 113 extend in radial direction and in axial direction, i.e. the extension of the ribs has a radial as well as an axial component. The extension of the ribs thus can also have a tangential component (direction arrow T) larger than zero. In the shown embodiment the tangential component of the extension of the ribs is zero so that the ribs 113 extend in strictly axial and strictly radial direction.

Chambers 114 are defined between adjacent ribs 113, the first end face 110 of the rotational body 9, and the upstream rotational surface 112. Those chambers 114 are open in the radial outward direction (arrow R) and in the upstream direction (opposite to arrow A).

Each chamber 114 is connected via at least one groove 111 with the downstream side 106 of the rotational body 109. Those grooves 111 are provided in the downstream rotational surface 103a.

The surface of revolution (not indicated with a reference number, but compare reference number 4 in FIG. 1) of the rotor 101 is defined by the downstream rotational surface 103a and the radial edges 103b of the ribs 113.

In the embodiment of FIG. 2 the downstream rotational surface 103a and the radial edges 103b of the ribs 1 13 both taper with respect to the rotational axis. As in this embodiment both tapers have a substantially constant taper angle (in case of the rotational surface 103a this taper angle is also called a surface angle), the surface of revolution of this rotor 101 is essentially conical. It is however noted that both tapers can also be different; that the radial edges 103b and/or the rotational surface 103a can also be non tapered; and that the radial edges 103b and/or the rotational surface 103a can also have a non-constant taper (i.e. the taper follows a curved line).

Figure 3:
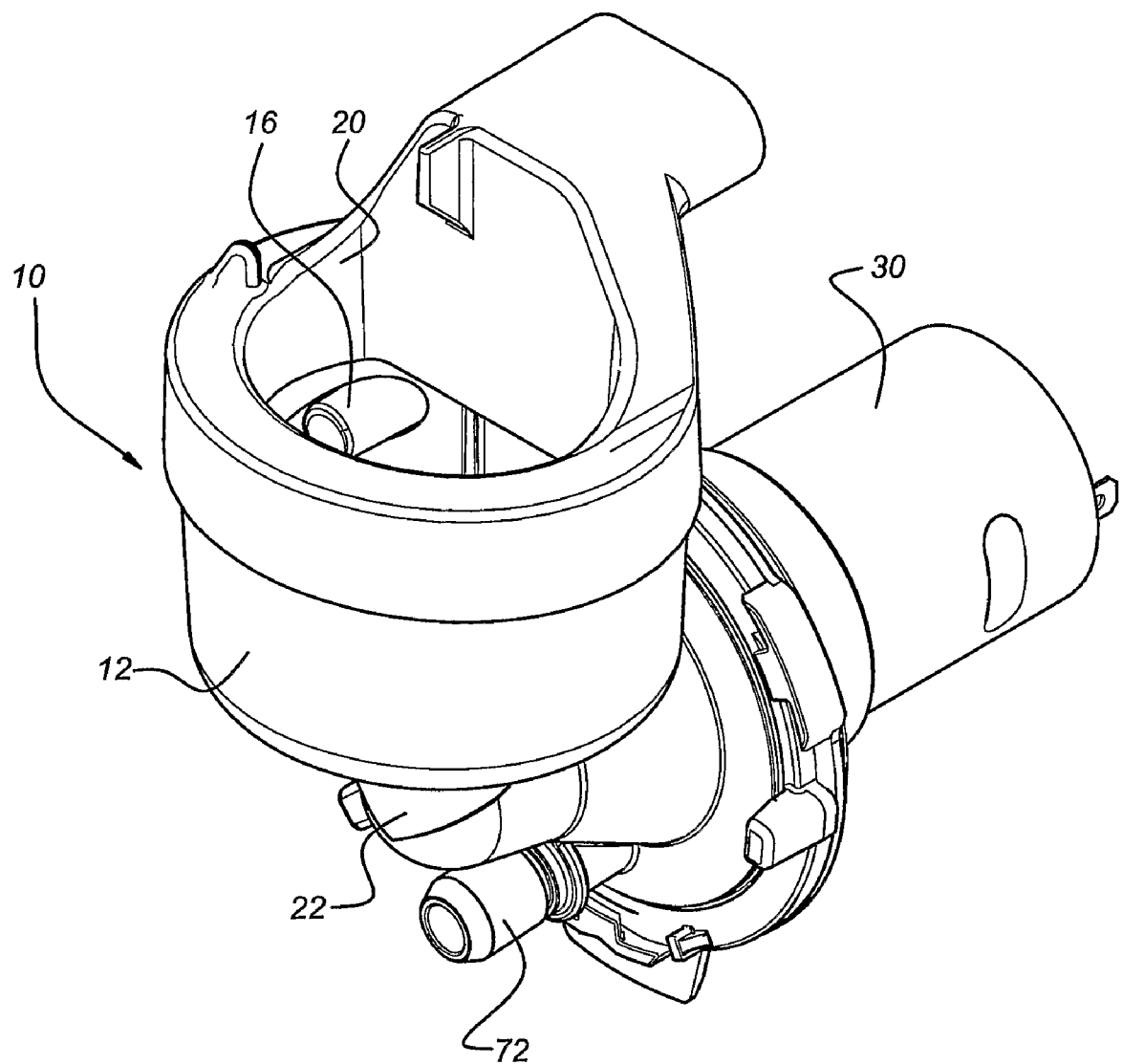
FIG. 3 is a perspective view of a preferred embodiment of the invention comprising a rotor according to FIG. 2.
Figure 4:
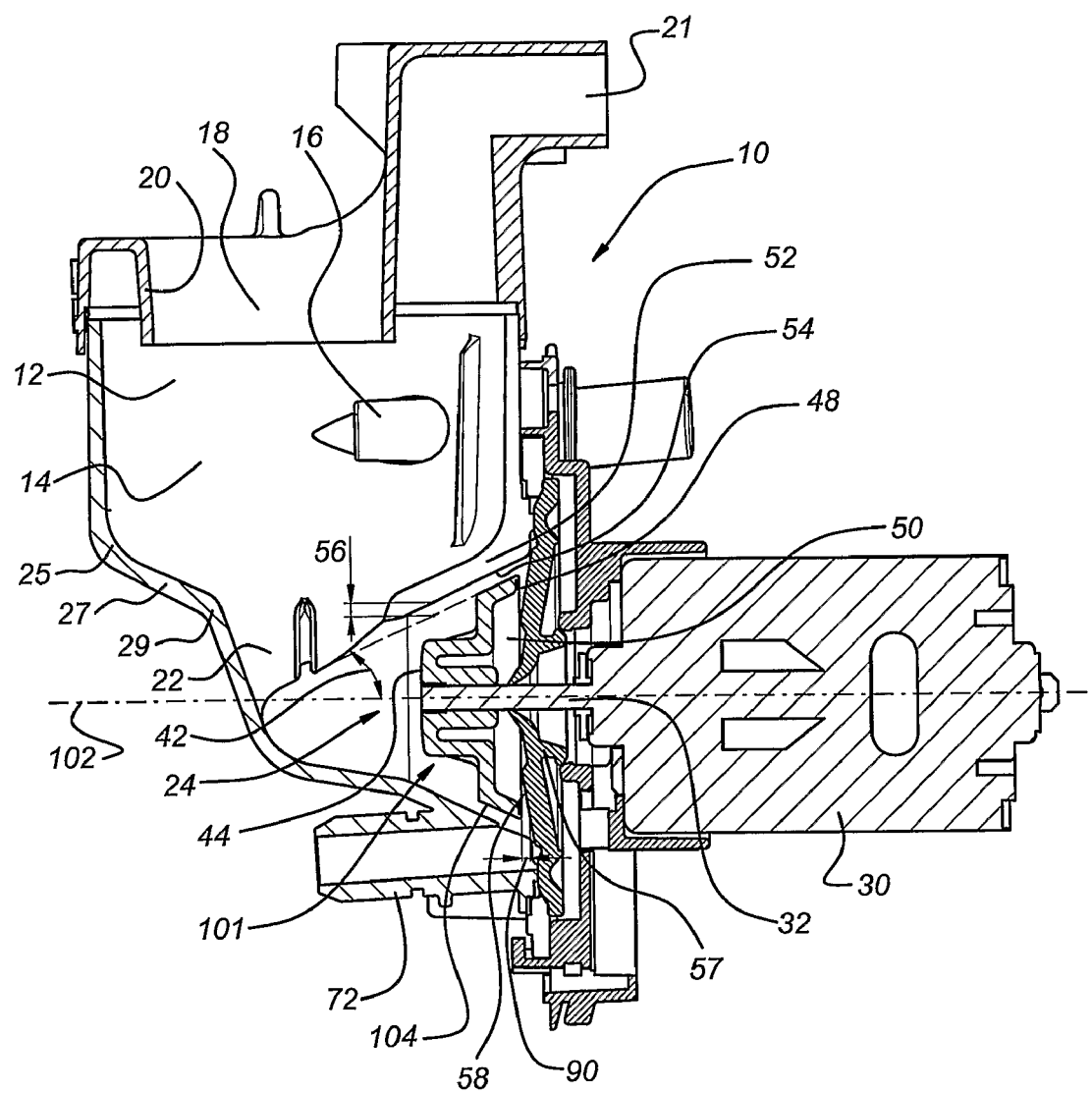
FIG. 4 is a cross-sectional view of the embodiment of FIG. 3.
Figure 5:
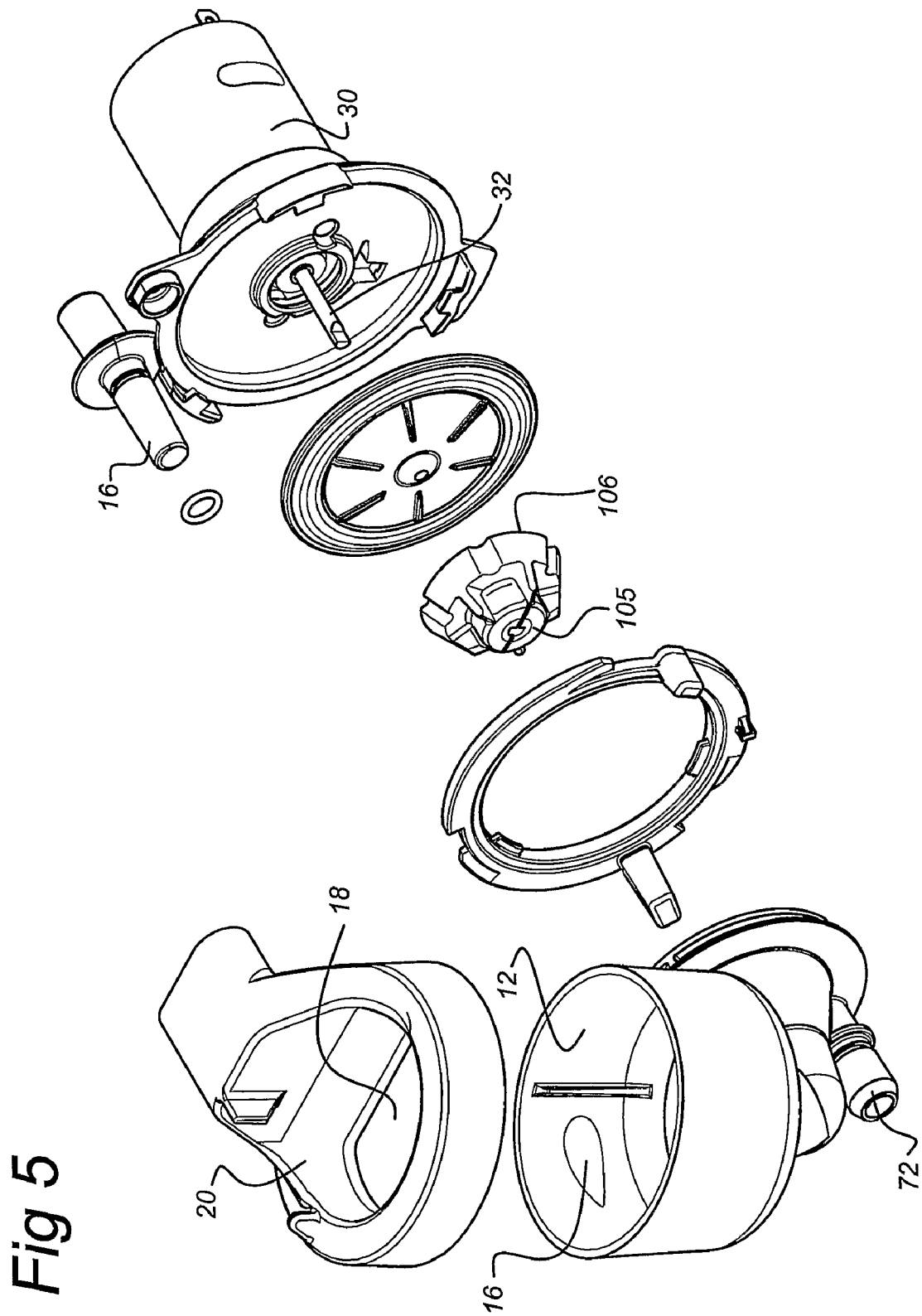
FIG. 5 is an exploded view of the embodiment of FIG. 3.

In the next following a rotor 101 according to the invention will be discussed in relation to a mixing device (comprising such a rotor) according to the invention, which is shown in FIGS. 3-5. With some exceptions, such as the rotor, the embodiment of the invention as shown in FIGS. 3-5 is identical to the mixing device as described in WO 03/065039. This WO 03/068039 is in this respect fully incorporated by reference. Although the embodiment of the invention according to FIGS. 3-5 is a preferred embodiment, it will be clear that scope of this invention is defined by the claims and not by the preferred embodiment.

Referring to FIGS. 3 and 4, a preferred embodiment of the invention is a mixing device 10 that includes an input container 12. The input container 12 comprises a bowl portion 14 with a tangential inlet 16 for feeding a fluid under pressure. An automatically controlled valve is preferably provided to control the fluid flow into the input container 12. The fluid is introduced through the inlet at a speed selected to produce a swirling flow, preferably substantially a whirlpool effect.

A component to be mixed with the fluid, preferably a powdered food substance, is fed into powder inlet 18, which preferably includes an opening at the top of the bowl portion 14. The powder can be fed by hand or automatically by a powder source, preferably disposed above the device 10. The powder source preferably has a dosing mechanism, such as a dosing screw, to automatically dose a predetermined amount of powder into the input container 12. A lip 20 extends around the interior of the powder inlet 18, protruding into the bowl portion 14 to prevent the swirling fluid from exiting the input container 12 by the upper side thereof. A suction is applied to orifice 21, connected to the underside of the lip 20 for extracting any splashed material. The powder inlet is sufficiently large to receive the powder poured therein and also to receive a sufficient amount of air for mixing with the fluid and component.

In the embodiment shown, a throat portion 22 of the input container 12 is disposed below the bowl portion 14. The throat portion 22 preferably has a narrower diameter than the bowl portion 14 and has a throat opening 24 disposed on a lateral side, as shown in FIG. 2. The throat portion 22 is preferably generally coaxial with the bowl portion 14 and narrows substantially evenly along the axis of the bowl portion 14. This improves the fluid flow therein and reduces any trapping of powder. Preferably, a transition between the bowl portion 14 and the throat portion 22 has an inward bend 25, followed by a sloped portion 27, which is followed by an outward bend 29, in cross-section.

Referring to FIGS. 4 and 5, a rotor assembly is in fluid communication with the input container 14, preferably at the throat opening 24. The rotor assembly includes a rotor 101. A motor 30 drives rotor shaft 32, which drives the rotor 101 so that the motor 30 drives the rotor at about rotor axis 34 rotational axis 102, also called the rotor axis. A motor controller is preferably provided to control the operation and speed of the motor 30.

The preferred rotor 101 has a conical surface of revolution 104. The conical surface of revolution 104 preferably faces outwardly with respect to the rotor axis 102 and can have a substantially straight cross-section, as in the embodiment shown, or can be curved in cross-section with a taper angle that varies along the axial length of the rotor 101. The surface of revolution in the embodiment shown extends at a surface angle 42 to the rotor axis 102. Surface angle 42 is the average angle between first and second axial end 105, 106, and the surface of revolution 104 is preferably substantially continuous about its circumference between the axial ends 105, 106. The angle may change beyond the axial ends 105, 106. Surface angle 42 is preferably about between 5° and 85°, more preferably about between 10° and 45°, still more preferably about between 15° and 35°, and most preferably about between 20° and 30°.

The preferred surface of revolution 104 extends substantially between first and second axial ends 105, 106. As the surface of revolution 104 is conical or tapered, the first axial end 105 has a smaller diameter than the second axial end 106. The first axial end 105 preferably faces the interior of the input container 12, with the second axial end 106 disposed on an opposite side of the surface of revolution 104. In the preferred embodiment, the diameter of the second axial end 106 is at least about 10% larger than the diameter of the first axial end 105. More preferably, second axial end diameter is about between 1.25 and 2.5 times the size of the first axial end diameter. The surface of revolution 104 preferably has an axial length of about between a quarter and twice the size of the first axial end diameter. In one embodiment, the first axial end diameter is about between 13 to 25 mm, and the second axial end diameter is about between 30 and 35 mm, with an axial length between the axial ends of between about 10 and 25 mm. The diameter of the rotor, including of the axial ends are preferably measured to widest point at the station being measured along the axis 102. Thus, the diameter of a rotor with protrusions, such as ribs 113, is measured to the tip of the protrusions. Grooves 111 on the surface of revolution are not deeper than about 6 mm in the preferred embodiment.

The surface of revolution 104 preferably has a surface area of at least about 800 $mm^2$ and more preferably at least about 100 $mm^2$, and preferably at most about 3000 $mm^2$ and more preferably at most about 2000 $mm^2$. Most preferably, the surface area is of from about 1000 to 1200 $mm^2$. This surface area is calculated taking the cross sections of the surface as being circular and having the diameter of the rotor at the relevant axial sections as described above.

Additionally, in the embodiment shown, the axial ends 105, 106 are located at the extreme ends of the frustoconical rotor 101. In other embodiments, the axial ends 105, 106 may be located remotely from the ends of the rotor. In one embodiment, the first, smaller axial end 105 is defined as being at the portion of the tapered rotor where the diameter becomes at least about 13 mm. Thus, this embodiment has a surface of revolution measured from the location on the rotor where the diameter becomes at least about 13 mm. This alternative embodiment may also have a second surface portion of the rotor that extends in the direction away from the second axial end, and which can be continuous and can follow the adjacent surface of revolution. The second surface portion may extend to the most upstream end of the rotor. In another embodiment, the surface portion is measured from the location on the rotor where the diameter becomes at least about 20 mm, and in yet another embodiment, it is measured from the location on the rotor where the diameter becomes at least about 25 mm.

In the preferred embodiment, the second or rear rotor face 48 preferably includes a recessed portion 50 facing in an opposite direction from the front face 44. In the drawings, the first 44 and second 48 rotor faces are disposed at the first and second axial ends 105, 106. In the alternative embodiment described in which one or both of the axial ends 105, 106 is located remotely from the end of the rotor itself, one or both of the axial ends and the rotor faces, respectively, are also disposed remotely from each other.

The rotor 101 is disposed within a rotor housing 52, which in the embodiment shown is integral part of unitary construction with the input container 12. The preferred rotor housing 52 has an inner housing surface 54 with a shape substantially corresponding to the surface of revolution 104. A shear gap 56 is defined between the housing surface 54 and surface of revolution 104 that has a width selected to provide a sufficient flow rate and energy, transfer to the mixture, for a desired foaming effect.

Measured in a direction perpendicular to the rotor axis 102, the shear gap 56 is preferably at least about 1.5 mm, more preferably at least about 1.8 mm, and most preferably at least 2 mm. Measured in this direction, the shear gap 56 is preferably at most about 3 mm and more preferably at most about 2.5 mm. In one embodiment the shear gap is about 2-2.5 mm, such as 2.25 mm. The conical shape of the surface of revolution 104 provides a long shear gap 56 for acting on the fluid mixture, while providing a pumping action and without requiring an extremely large radius.

As shown in FIGS. 2 and 5, the downstream surface 103*a* preferably defines a plurality of rounded grooves 111, extending between the first 110 and second 106 end surfaces. The preferred grooves 111 could be twisted to spiral along the axial length of the rotor, however in the shown embodiment they extend in axial direction without twist. The grooves 111 of the present embodiment are about between 0.5 and 3 mm deep. The grooves 111 are preferably configured and dimensioned for keeping the relating motion of the fluid going. In the meantime the sheer gap 56 between the rotor and the housing acts to give the air bubbles in the froth a more uniform size, by breaking up the larger bubbles and creating smaller bubbles out of them. The more uniform size of the air bubbles gives the froth a belly appearance and the smaller size gives a better stability. In case of twisted grooves 111, the motor 30 can turn the rotor 101 in or against the direction of the grooves 111 depending on the pumping and frothing effect desired. But also in case of non-twisted grooves 111, the motor can turn the rotor in two opposing directions.

A wall member 57 including a back wall 58 is disposed behind the rotor, facing the second axial end 106 and the rear rotor face 48. Like in WO 03/068039, the back wall 58 can include protrusions, which are preferably at least one rib that protrude towards the rotor 101. However, contrary to WO 03/068039, the back wall 58 can, due to the present rotor design also be without protrusions.

The rotor 101 is preferably spaced from the wall member 57. In the preferred embodiment, the second axial end 106 of the rotor 101 is spaced from the wall member 57 at a spacing 90 of at least about 1,5 mm, more preferably at least about 2 mm, and most preferably at least about 3 mm. The spacing between the rotor 101 and the wall member is preferably at most about 8 mm, more preferably at most about 6 mm, and most preferably at most about 5 mm. A practical embodiment has a spacing of about 2.5 mm near the centre and about 4 mm near the outer edge of the second end surface 106.

In order to provide sufficient room for the mixed and frothed fluid to exit the mixing device, the back: wall 58 preferably has a larger outer diameter than the rotor 101, preferably at least about 20% larger and more preferably at least about 30% larger, and further are preferably at most about 60% larger, and more preferably at most about 40% larger. For example, the diameter of the back wall 58 can be about 37,5% larger than the diameter of the second axial end of the rotor. The outer diameter of the back wall 58 of the preferred embodiment is at least about 40 mm and at most about 60 mm.

A product exit tube 72 is disposed downstream of the rotor 101 and back wall 58 and is disposed to dispense the foamed fluid mixture. The product exit tube 72 is shown as an integral part of unitary construction with the input container 12. The product exit tube 72 preferably comprises a conduit with a diameter selected according to the final product that is to be dispensed. The preferred product exit tube 72 has an internal diameter of about between 2 mm and 8 mm for embodiments intended to prepare several different milk and coffee beverages. Embodiments intended primarily for coffee preferably have a product exit tube 72 with an internal diameter of about between 2 mm and 5 mm, and in embodiments intended primarily for milk, the internal diameter is preferably from about 4 mm to 8 mm. The diameter of the product exit tube 72 is selected to obtain the desired pumping performance from the rotor 101. Increasing the diameter of the conduit allows a faster flow, while decreasing the diameter provides more backpressure to retain the fluid mixture in the rotor assembly and input chamber 12 for a longer time. In embodiments used for milk and coffee beverages, the internal diameter of the exit tube 72 is according to the invention between 4 mm and 6 mm. An exit tube 72 with an internal diameter smaller than 2 mm, has the disadvantage that the properties of the materials used to manufacture the tube will increasingly (with decreasing diameter) start to interfere with the fluid. This could result in the liquid not wanting to pass through the exit tube as a consequence of for example adhesy, cohesy, hydrophobic and hydrophilic properties.

In use, the fluid is tangentially introduced into the input container 12 through tangential inlet 16. In the preferred embodiment, the fluid comprises water, and the flow rate is about between 3 mL/sec and 30 mL/sec, more preferably about between 5 mL/sec and 15 mL/sec, and most preferably about between 9 mL/sec and 12 mL/sec. At the time or preferably after the water flow into the input container 12 is commenced, a powdered food component, such as a powdered coffee product and/or powdered milk, is dosed into the water through powder inlet 18. Preferably the powder dosing begins at least about 0.1 sec after the water dosing begins and more preferably at least about 0.3 sec. later, and preferably at most about 3 sec later, and more preferably at most about 1.0 sec later. Preferably the water is continued to be fed into the input container 12 until the powder dosing is stopped, and preferably at most about 8 sec after the powder dosing ends, and more preferably at most about 3 sec later, and preferably at least about 1.0 sec later.

The water and powder start getting mixed in the swirling flow within the input container 12, including the throat portion 22. The rotor 101 is rotated by the motor 30 at a speed sufficient for pumping the mixture towards the product exit tube 72 and for producing the desired foaming and aeration effect. The rotor 12 sucks in air for incorporation into the mixture. The configuration and location of the back wall 58 with respect to the rotor 101 continues the frothing effect, increasing the efficiency of the device. The rotation of the rotor 101 and the shape of the back wall 58 centrifugally keep the fluid product from accumulating behind the rotor. The speed of the rotor 101 is preferably variable to enable a speed selection to deliver the desired amount of energy to the mixture to produce the desired frothing. For obtaining products of certain qualities, the rotation speed of the rotor 101 is varied between two or more speeds during the preparation of a single product.

The device 10 provides a high specific energy dissipation to generate a milk froth and a moderately low specific energy dissipation to obtain a high quality coffee cream in the same unit. The frothed product is then dispensed through the product exit tube 72.

It has been found that to generate an authentic quality milk froth when using a milk powder in a beverage dispenser, the specific energy dissipation should be above about 1 J/g of product, which includes milk: powder and water together. Authentic milk froth as referred to in the present application is a frothed product with at least an equal volume of milk foam compared to the volume of liquid. The milk, foam in the product having authentic milk, froth preferably has a density of about between 50 mg/L and 300 mg/L. An authentic cappuccino can be made with the device of the present invention, which has a volume made up by about ⅓ coffee, about ⅓ frothed milk foam, and about ⅓ of milk that remained liquid after frothing. The preferred milk fraction in the authentic cappuccino has a volume that is at least as large as the volume of the liquid portion. The foam of the frothed milk in the final prepared beverage product is preferably stable, having at least about ⅔ of the foam volume remaining after 10 minutes.

The energy dissipation of the device can be controlled by adjusting the shear gap, rotor speed, and product flow rate, although these quantities are interdependent. A reduction in the shear gap, an increase in rotor speed, and a decrease in flow rate will provide a higher energy dissipation. The preferred flow rate is between at least about 5 g/sec and up to about 30 g/sec, and more preferably at least about 8 g/sec and up to about 15 g/sec. If the size of the gap is reduced, the flow rates will correspondingly be reduced and the amount of air drawn into the gap will be reduced as well, reducing foaming and aeration, and friction is increased. Also, if the rotational speed (i.e., "rpm") is increased, noise and cost of the machine will increase as well.

The embodiments described above allow a device of compact size, and with a desirable flow rate for preparing individual drinks to be provided without requiring extremely high rotor speeds, such as of above about 30,000 rpm. The preferred rotational speeds used for foamed coffee or milk froth are of from 10,000 to 30,000 rpm, most preferably between 10,000 to 25,000 rpm.

However, also in the range below 10,000 rpm there is, compared with prior art devices operated at the same rotor speeds below 10,000 rpm, an improved performance with good frothing results. With respect to the prior art, good results are obtained with rotor speeds as from 3,000 rpm, preferably as from 5,000 rpm, more preferably as from 7,500 rpm, but still below or at 10,000 rpm.

The rotor design according to the invention enables for example to operate a device according to WO 03/068039 to be operated at lower rotor speeds (i.e. lower rpm) without decreasing its reliability.

Making the ribs at the upstream part of the rotary (i.e. the part where the hot water/ingredient mixture coming from the input container 12 above enters the rotor assembly) allows for (little) chambers 112 where un-dissolved larger ingredient particles can enter without blocking the movement of the rotor or cause any other damage. This consequently also allows for coarser ingredients (components) to be used. In the chambers 112 also air can be trapped, which is, when the rotor is rotating, beaten in the hot water-ingredient-mixture so that the frothing process is improved.

When rotated at sufficient high speed, the ribs 112 create a greater turbulence enforcing contact between the water and the un-dissolved ingredient (component). In practice this greater turbulence extends not only over the upstream part of the rotor but also cover the downstream part (thus essentially over the entire rotor), which forces all the ingredient to be dissolved before it can stick to the rotor. In case some un-dissolved or partially dissolved ingredient is still sticking to the surface of the rotor or to the inside of the rotor chamber, this sticking ingredient will be removed by the violent movement of the water.

The improved design of the rotor also makes—as experiments indicate—the dimensions as given in WO 03/068039 less critical.

While illustrative embodiments of the invention are disclosed herein, it will be appreciated that numerous modifications and other embodiments may be devised by those skilled in the art. Therefore, it will be understood that the appended claims are intended to cover all such modifications and embodiments that come within the spirit and scope of the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A mixing device for aerating and frothing a product that comprises a fluid component and at least one further component, comprising:
   a rotor having a rotational axis and a surface of revolution defined by the rotor upon rotation around its rotational axis, the surface of revolution extending from a first axial end to a second axial end, and the first axial end being located upstream with respect to the second axial end;
   a motor for rotating the rotor about the rotational axis; and
   a product exit conduit located downstream of the rotor and configured for dispensing the aerated and frothed product of the fluid and at least one further component, the rotor comprising a downstream part and an upstream part, the downstream part comprises a rotational body having a first end surface facing upstream, a second end surface facing downstream and a downstream rotational surface facing in a radial outward direction, the upstream part comprises an upstream rotational surface facing in a radial outward direction, the upstream rotational surface being provided with ribs, the ribs having radial edges facing in a radial outward direction, chambers being defined between adjacent ribs, the first end face and the upstream rotational surface, and the surface of revolution is defined by the downstream rotational surface and the radial edges of the ribs, and wherein, with respect to the rotational axis, the downstream rotational surface tapers, in an upstream direction.

2. The mixing device according to claim 1, wherein the upstream rotational surface is a conical surface which tapers in an upstream direction at an angle less than an angle at which the downstream rotational surface tapers.

3. The mixing device according to claim 1, wherein the downstream rotational surface is provided with grooves extending from the first to the second end surface.

4. The mixing device according to claim 3, wherein in each chamber extends at least one of the grooves.

5. The mixing device according to claim 1, wherein the diameter of the surface of revolution at the first axial end is smaller than the diameter of the surface of revolution at the second axial end.

6. The mixing device according to claim 1, wherein the upstream rotational surface is a cylindrical surface.

7. The mixing device according to claim 1, wherein the ribs extend essentially in an axial direction and in a radial direction.

8. The mixing device according to claim 1, wherein when viewed in a tangential direction, the width of each chamber is larger than the width of the grooves extending into it.

9. The mixing device according to claim 1, wherein the motor and rotor are configured for providing energy dissipation to the product of about between 1 J/g and 2.5 J/g with a product flow rate of about between 5 g/sec and 30 g/sec.

10. The mixing device according to claim 1, wherein the motor and rotor are configured for providing energy dissipation to the product selectively in at least the range of about 0.5 J/g to 1.5 J/g with a product flow rate of about between 5 g/sec and 30 g/sec.

11. The mixing device according to claim 1, wherein the surface of revolution is oriented at a surface angle to the rotational axis of about between 5° and 85°.

12. The mixing device according to claim 1, wherein the surface of revolution has an area of about between 1000 mm$^2$ and 3000 mm$^2$.

13. The mixing device according to claim 1, wherein the surface of revolution has an axial length of about between 1/8 and 4 times the size of the diameter of the surface of revolution at the first axial end.

14. The mixing device according to claim 1, wherein the surface of revolution is a conical surface and has a substantially constant surface angle between the first and second axial end.

15. The mixing device according to claim 1, wherein the rotor housing has a shape substantially corresponding to the surface of revolution.

16. The mixing device according to claim 15, wherein a shear gap is defined between the housing and the rotor, perpendicular to the rotational axis, having a width of about between 1.0 mm and 3.0 mm.

17. The mixing device according to claim 1, wherein the grooves have a depth of at most about 8 mm.

18. The mixing device according to claim 1 comprising a first wall member disposed downstream of and facing the second axial end, the first wall member being spaced from the second axial end by about between 2.0 mm and 6 mm.

19. The mixing device according to claim 18, wherein the first wall is spaced from the second axial end by about between 3 mm and 5 mm.

20. The mixing device according to claim 1, further comprising a motor controller configured for selective operation at various speeds.

21. The mixing device according to claim 20, wherein the motor controller is configured for varying the rotation speed of the motor between a first speed and a second speed during the production of a single product.

22. A beverage machine provided with a mixing device according to claim 1, comprising a water supply system for the fluid component and at least one container for the at least one further component.

23. A mixing device for aerating and frothing a product that comprises a fluid component and at least one further component, comprising:

a rotor having a rotational axis and a surface of revolution defined by the rotor upon rotation around its rotational axis, the surface of revolution extending from a first axial end to a second axial end, and the first axial end being located upstream with respect to the second axial end;

a motor for rotating the rotor about the rotational axis; and a product exit conduit located downstream of the rotor and configured for dispensing the aerated and frothed product of the fluid and at least one further component, the rotor comprising a downstream part and an upstream part, the downstream part comprises a rotational body having a first end surface facing upstream, a second end surface facing downstream and a downstream rotational surface facing in a radial outward direction, the upstream part comprises an upstream rotational surface facing in a radial outward direction, the upstream rotational surface being provided with ribs, the ribs having radial edges facing in a radial outward direction, chambers being defined between adjacent ribs, the first end face and the upstream rotational surface, and the surface of revolution is defined by the downstream rotational surface and the radial edges of the ribs, wherein an angle of taper of the downstream rotational surface is different from, an angle of taper of the part of the surface of revolution determined by the radial edges of the ribs.

24. A beverage machine provided with a mixing device according to claim 23, comprising a water supply system for the fluid component and at least one container for the at least one further component.

25. The mixing device according to claim 23, wherein the part of the surface of revolution determined by the radial edges of the ribs, in an upstream direction.

26. The mixing device according to claim 23, wherein the surface of revolution is oriented at a surface angle to the rotational axis of about between 10° and 45°.

27. A mixing device for aerating and frothing a product that comprises a fluid component and at least one further component, comprising:
- a rotor having a rotational axis and a surface of revolution defined by the rotor upon rotation around its rotational axis, the surface of revolution extending from a first axial end to a second axial end, and the first axial end being located upstream with respect to the second axial end;
- a motor for rotating the rotor about the rotational axis; and
- a product exit conduit located downstream of the rotor and configured for dispensing the aerated and frothed product of the fluid and at least one further component,
- the rotor comprising a downstream part and an upstream part,
- the downstream part comprises a rotational body having a first end surface facing upstream, a second end surface facing downstream and a downstream rotational surface facing in a radial outward direction,
- the upstream part comprises an upstream rotational surface facing in a radial outward direction, the upstream rotational surface being provided with ribs, the ribs having radial edges facing in a radial outward direction, chambers being defined between adjacent ribs, the first end face and the upstream rotational surface, and
- the surface of revolution is defined by the downstream rotational surface and the radial edges of the ribs, wherein an axial length of the upstream part and an axial length of the downstream part are about the same.

28. A beverage machine provided with a mixing device according to claim 27, comprising a water supply system for the fluid component and at least one container for the at least one further component.

29. The mixing device according to claim 27, wherein, with respect to the rotational axis, the radial edges of the ribs taper, in an upstream direction.

* * * * *